(12) United States Patent
Ricco et al.

(10) Patent No.: US 7,263,979 B2
(45) Date of Patent: Sep. 4, 2007

(54) HIGH-PRESSURE PUMP WITH A DEVICE FOR REGULATING THE FLOW RATE FOR A FUEL-INJECTION SYSTEM

(75) Inventors: Mario Ricco, Valenzano (IT); Sisto Luigi De Matthaeis, Valenzano (IT); Raffaele Ricco, Valenzano (IT); Onofrio De Michele, Valenzano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 11/114,091

(22) Filed: Apr. 26, 2005

(65) Prior Publication Data

US 2006/0104826 A1  May 18, 2006

(30) Foreign Application Priority Data

Nov. 12, 2004  (EP) .................................. 04425840

(51) Int. Cl.
*F02M 37/04* (2006.01)
(52) U.S. Cl. ........................ 123/500; 123/446
(58) Field of Classification Search ............... 123/446, 123/500, 501, 514, 456, 179.17
See application file for complete search history.

(56) References Cited

U.S. PATENT DOCUMENTS

| | | | | |
|---|---|---|---|---|
| 4,884,545 A * | 12/1989 | Mathis | ........................ | 123/447 |
| 5,884,606 A * | 3/1999 | Kellner et al. | ............... | 123/446 |
| 6,568,927 B1 * | 5/2003 | Guentert | ...................... | 417/569 |
| 6,581,577 B1 * | 6/2003 | Geyer | ......................... | 123/514 |
| 6,701,898 B2 * | 3/2004 | Tokuo et al. | ............... | 123/456 |
| 6,895,936 B2 * | 5/2005 | Kuroda | ........................ | 123/446 |
| 6,899,083 B2 * | 5/2005 | Djordjevic | ................. | 123/446 |
| 6,966,300 B2 * | 11/2005 | Fukuda | ........................ | 123/446 |
| 6,976,473 B2 * | 12/2005 | Boos et al. | ................ | 123/446 |
| 2002/0162537 A1 * | 11/2002 | Smith et al. | ................ | 123/446 |
| 2004/0000289 A1 * | 1/2004 | Seo et al. | .................... | 123/447 |
| 2004/0103883 A1 * | 6/2004 | Geyer | ........................ | 123/446 |
| 2004/0200456 A1 * | 10/2004 | Eser et al. | .................. | 123/458 |

FOREIGN PATENT DOCUMENTS

| | | |
|---|---|---|
| DE | 103 45 154 A1 | 4/2004 |
| EP | 1 219 827 A1 | 7/2002 |
| EP | 1 241 338 A2 | 9/2002 |
| EP | 1 298 316 A2 | 4/2003 |
| EP | 1 469 190 A1 | 10/2004 |

* cited by examiner

*Primary Examiner*—Carl S. Miller
(74) *Attorney, Agent, or Firm*—Arent Fox LLP

(57) ABSTRACT

The high-pressure pump (7) comprises a number of pumping elements (18) actuated in reciprocating motion through corresponding suction and delivery strokes. Each pumping element (18) is provided with a corresponding intake valve (25) in communication with an intake pipe (10) supplied by a low-pressure pump (9). Set on the intake pipe (10) is an on-off solenoid valve (27) having a reduced flow rate substantially of the same order of magnitude as the maximum amount of fuel that can be injected by an injector (5). The solenoid valve (27) is controlled in a chopped way in synchronism with an intermediate part (32) of the suction stroke of each pumping element (18).

13 Claims, 4 Drawing Sheets

HIGH-PRESSURE PUMP WITH A DEVICE FOR REGULATING THE FLOW RATE FOR A FUEL-INJECTION SYSTEM

BACKGROUND OF THE INVENTION

1. Field of the Invention

The present invention relates to a high-pressure pump with a device for regulating the flow rate for a fuel injection system of an internal combustion engine.

2. Description of the Related Art

As is known, in modern internal combustion engines, the high-pressure pump is designed to send fuel to a common rail having a pre-set accumulation volume of pressurized fuel, for supplying a plurality of injectors associated to the cylinders of the engine. To obtain a proper atomization of the fuel, this must be brought to a very high pressure, in the region of 1600 bar in the conditions of maximum power of the engine. The pressure of the fuel required in the common rail is in general defined by an electronic control unit as a function of the operating conditions, i.e., the running conditions of the engine.

Injection systems are known in which a by-pass solenoid valve, arranged on the delivery pipe of the pump, is controlled by the control unit for draining off directly the excess fuel just pumped into the usual fuel tank, before said fuel enters the common rail.

Since the flow rate of the high-pressure pump in general depends upon the speed of rotation of the engine crankshaft, it must be sized so as to achieve the maximum flow-rate and pressure values required by the various operating conditions of the engine. In certain operating conditions, for example at the maximum speed but with low power of the engine shaft, the flow rate of the pump proves overabundant, and the fuel in excess is simply drained off into the tank. Consequently, these known regulation devices present the drawback of dissipating part of the work of compression of the high-pressure pump in the form of heat.

Variable-flow-rate high-pressure pumps have been proposed to reduce the amount of fuel pumped when the engine functions at low power. In one of these pumps, the intake pipe is provided with a flow-rate regulation device comprising a restriction with a cross section that varies with continuity, which is controlled by the electronic-control unit as a function of the pressure required in the common rail and/or as a function of the operating conditions of the engine.

In particular, the restriction in the intake pipe is supplied with a constant pressure difference $\Delta P$ of approximately 5 bar, supplied by an auxiliary pump. By varying with continuity the effective area of passage of the fuel, using a regulation solenoid valve, there is obtained a modulation of the amount taken in by the hydraulically connected pumping elements. The amount of fuel downstream of the regulation solenoid valve, i.e., the amount allowed at intake, is at a very low pressure and yields, at low flow rates, only a small contribution of force for opening the intake valve of the pumping element. Consequently, the usual return spring of the intake valve must be such as to guarantee opening thereof even at a minimum pressure downstream of the restriction. On the one hand, said spring must be calibrated in a very precise way, so that the pump proves relatively costly, and, on the other hand, there is always the risk that the intake valve will be unable to open on account of the negative pressure caused by the pumping element in the corresponding compression chamber, so that the pump does not function correctly and is highly subject to deterioration.

SUMMARY OF THE INVENTION

The purpose of the invention is to provide a high-pressure fuel pump with a flow-rate regulation device which is of high reliability and of contained cost and will enable the drawbacks of fuel pumps of the known art to be overcome.

According to the invention, the above purpose is achieved by a high-pressure pump with a flow-rate regulation device for a fuel-injection system of an internal combustion engine, comprising a number of pumping elements, which are actuated with reciprocating motion through corresponding suction and delivery strokes, each of said pumping elements being provided with a corresponding intake valve in communication with an intake pipe, and with a corresponding delivery valve in communication with an accumulation volume of pressurized fuel, said pump being characterized in that said regulation device comprises at least one solenoid valve for shut off of the fuel supplied to said pumping elements, said solenoid valve being set on said intake pipe and being actuated during the suction strokes of said pumping elements so that opening of said solenoid valve will take place with a certain delay with respect to the start of the suction strokes themselves.

In particular, the shut-off solenoid valve has a cross section such as to enable it to supply each pumping element only with the fuel required in the corresponding suction stroke, and is designed to be controlled in a chopped way by a control unit, which controls opening thereof during an intermediate part of each suction stroke of said pumping elements.

For a better understanding of the invention, there is provided a description of a preferred embodiment, by way of example and with the aid of the annexed drawings, in which:

DETAILED DESCRIPTION OF PREFERRED EMBODIMENTS

Figure 1:
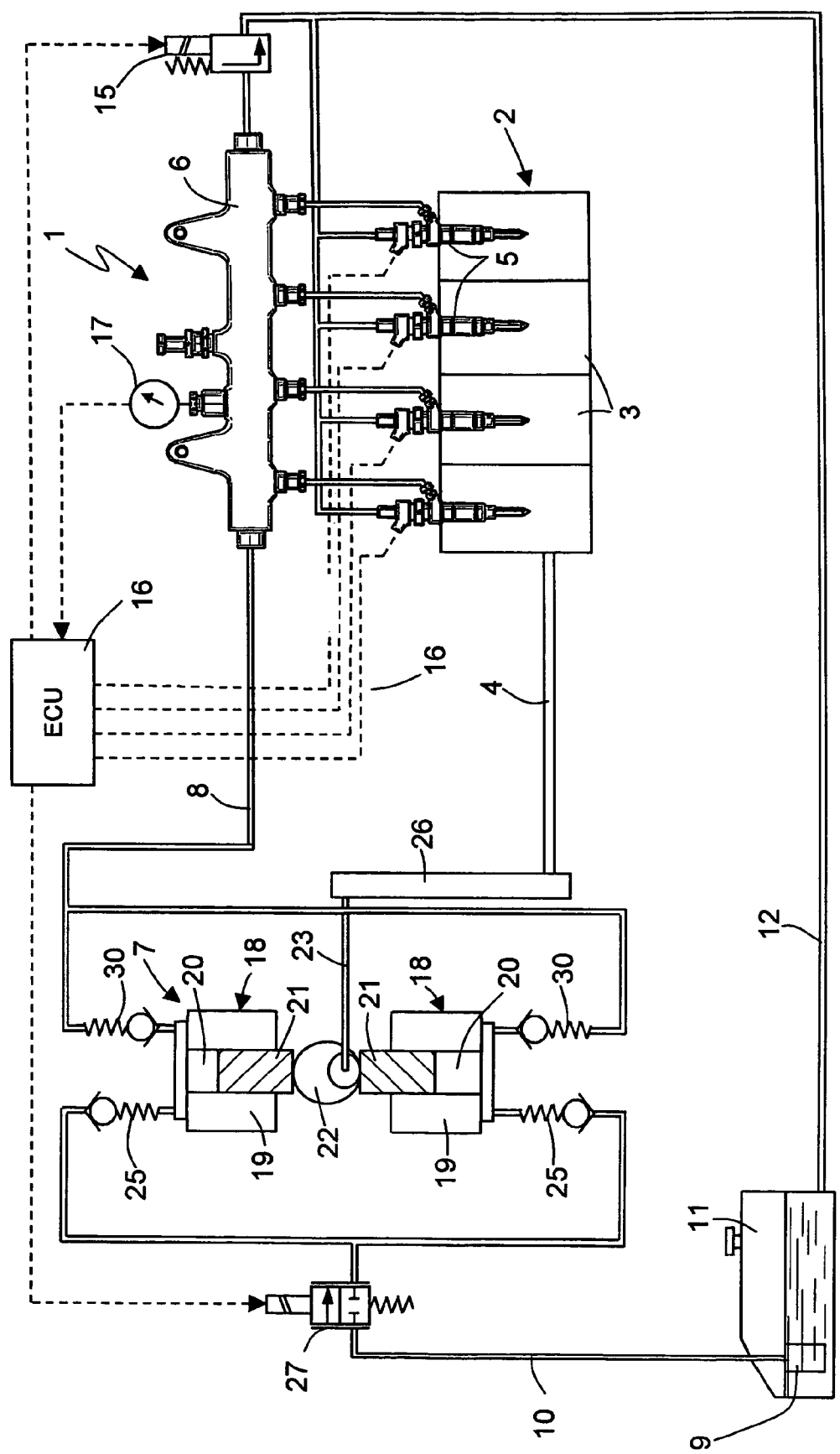
FIG. 1 is a diagram of a fuel-injection system in an internal-combustion engine, comprising a high-pressure pump with a flow-rate regulation device according to one embodiment of the invention.

With reference to FIG. 1, number 1 designates, as a whole, a fuel-injection system for an internal-combustion engine 2, for example a four-stroke diesel engine. The engine 2 comprises a plurality of cylinders 3, for example four cylinders, which co-operate with corresponding pistons (not shown), which can be actuated for rotating an engine shaft 4.

The injection system 1 comprises a plurality of electromagnetically controlled injectors 5, associated to the cylinders 3 and designed to inject therein the fuel at a high pressure. The injectors 5 are connected to an accumulation volume, which has a pre-set volume for one or more injectors 5. In the embodiment illustrated, the accumulation volume is formed by the usual common rail 6, connected to which are all the injectors 5.

The common rail 6 is supplied with fuel at a high pressure by a high-pressure pump, as a whole designated by 7, via a delivery pipe 8. In turn, the high-pressure pump 7 is supplied by a low-pressure pump, for example an electric pump 9, via an intake pipe 10 of the pump 7. The electric pump 9 is in general arranged in the usual fuel tank 11, into which there gives out a discharge pipe 12 for draining off the excess fuel of the injection system 1.

The common rail 6 is moreover provided with a drain solenoid valve 15 in communication with the discharge pipe 12. Each injector 5 is designed to inject, into the corresponding cylinder 3, an amount of fuel that varies between a minimum value and a maximum value, under the control of an electronic control unit 16, which can consist of the usual microprocessor control unit of the engine 2.

The control unit 16 is designed to receive signals indicating the operating conditions of the engine 2, such as the position of the accelerator pedal and the r.p.m. of the engine shaft 4, which are generated by corresponding sensors not shown, as well as the pressure of the fuel in the common rail 6, detected by a pressure sensor 17. By processing said signals received by means of an appropriate software, the control unit 16 controls the instant and duration of actuation of the individual injectors 5. Furthermore, the control unit 16 controls opening and closing of the discharge solenoid valve 15. Consequently, the discharge pipe 12 conveys towards the tank 11 both the drained fuel of the injectors 5 and the possible excess fuel in the common rail 6, discharged by the solenoid valve 15.

The high-pressure pump 7 comprises a pair of pumping elements 18, each formed by a cylinder 19 having a compression chamber 20, in which there slides a piston 21, which has a reciprocating motion, consisting of a suction stroke and a delivery stroke. Each compression chamber 20 is provided with a corresponding intake valve 25 and a corresponding delivery valve 30. The valves 25 and 30 can be of the ball type and can be provided with respective return springs. The two intake valves 25 are in communication with the intake pipe 10 common to both of them, whilst the two delivery valves 30 are in communication with the delivery pipe 8 common to them.

In particular, the piston 21 is actuated by a cam 22 carried by a shaft 23 for actuation of the pump 7. In the embodiment described herein, the two pumping elements 18 are coaxial and opposite to one another, and are actuated by a single cam 22.

The shaft 23 is connected to the engine shaft 4, via a motion transmitting device 26, such that the cam 22 controls a compression stroke of a piston 21 for each injection by the injectors 5 into the respective cylinders 3 of the engine 2.

In the tank 11, the fuel is at atmospheric pressure. In use, the electric pump 9 compresses the fuel to a low pressure, for example in the region of just 2-3 bar. In turn, the high-pressure pump 7 compresses the fuel received from the intake pipe 10 so as to send the fuel at a high pressure, for example in the region of 1600 bar, to the common rail 6, via the delivery pipe 8.

According to one embodiment of the invention, the flow rate of the pump 7 is controlled exclusively by a regulation device arranged on the intake pipe 10. The regulation device comprises a shut-off solenoid valve 27, of the on-off type, which is actuated at each suction stroke of the two pumping elements 18. Advantageously, the solenoid valve has a pumping section such as to enable direct supply of each pumping element 18 during only a portion of the corresponding suction stroke.

In particular, the displacement of each pumping element 18 is of the same order of magnitude as the maximum volume of fuel that an injector 5 can inject into a cylinder 3 of the engine 2 in the corresponding injection phase. Consequently, if the injector 5 is controlled for injecting an amount of fuel smaller than the maximum one, it is sufficient for the pumping element 18 to take in fuel for a part only of the suction stroke of the piston 21.

Figure 2:
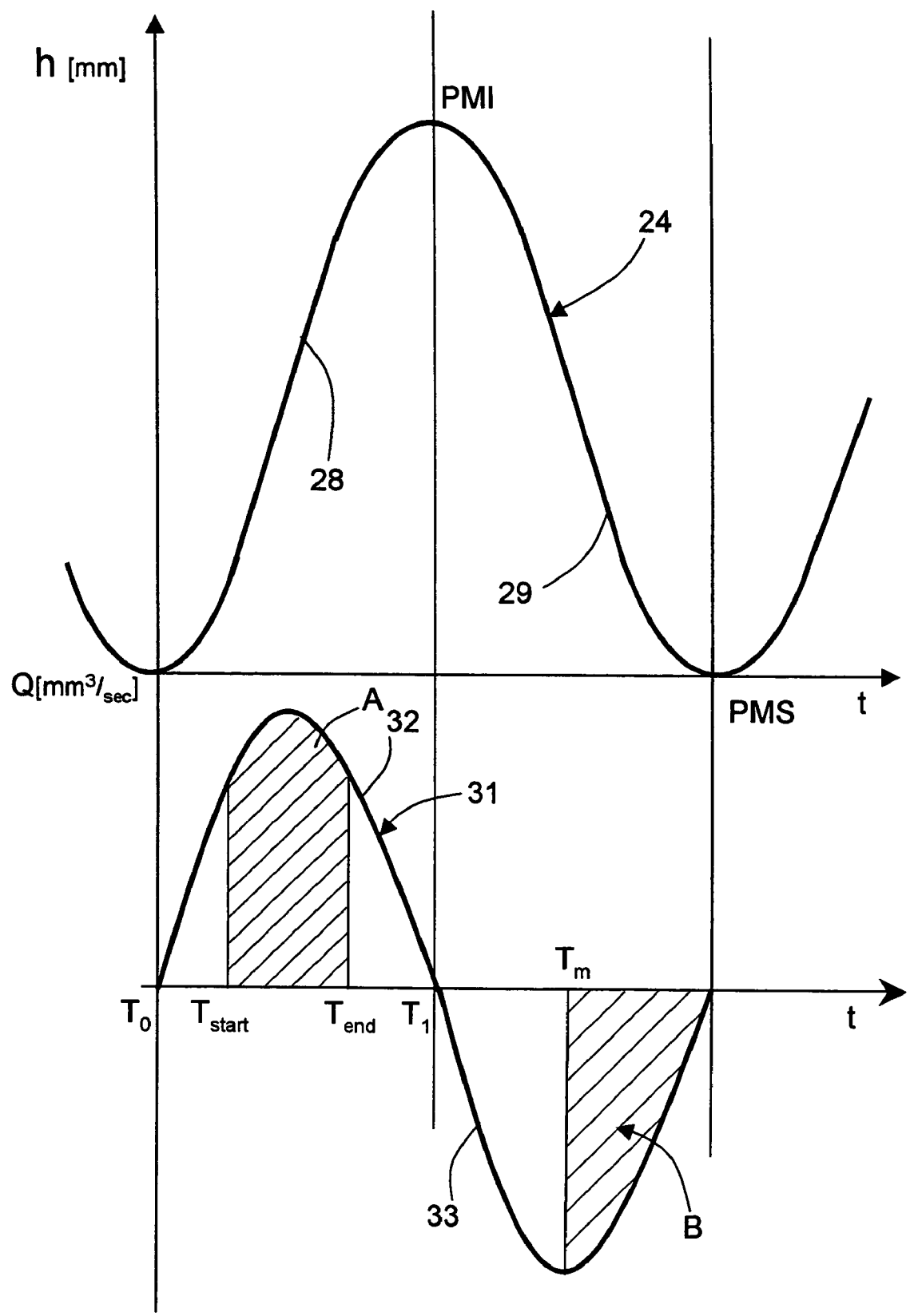
FIG. 2 is a diagram of the operation of the regulation device of FIG. 1.

In the diagram of FIG. 2, the curve 24 indicates, as a function of time t corresponding to the angle of rotation of the shaft 23, the displacement h of a piston 21 through a suction stroke 28 and a compression or delivery stroke 29, between a bottom dead centre PMI and a top dead centre PMS. Furthermore, the sinusoidal curve 31 indicates the speed of the piston 21 itself once again as a function of the angle of rotation of the shaft 23. The curve 31 comprises a half-wave 32, which corresponds to the speed of the suction stroke of the corresponding piston 21, and a half-wave 33, which corresponds to the speed of the delivery stroke of the corresponding piston 21. The area under the half-wave 32, equivalent to the one under the half-wave 33, represents the volume of fuel that can be taken in through the intake pipe 10, i.e., it coincides with the displacement of the pumping element, whilst the area under the half-wave 33 represents the volume of fuel that may be delivered into the pipe 8.

The on-off solenoid valve 27 (FIG. 1) is designed to be controlled in a chopped way by the control unit 16, as a function of the pressure of the fuel in the rail 6, and/or of the operating conditions of the engine 2. In particular, the control unit 16 controls opening of the solenoid valve 27 in Pulse Width Modulation (PWM), for a time interval, i.e., for a part of the suction stroke of the piston 21 of each of the two pumping elements 18.

More precisely, the unit 16 is designed to modulate both the instant Tstart of start of opening of the solenoid valve 27, and the instant Tend of end of opening of the solenoid valve 27 itself, with respect to the instant To of start of the suction stroke of the pumping element 18. In particular, the solenoid valve 27 is opened with a certain delay with respect to the start of the suction stroke of the pumping element 18, and the amount (Tstart−To) of the delay is such that at the instant in which the solenoid valve 27 is opened, the intake valve 25 of the other pumping element 18, which at that moment is in the compression phase, is certainly closed. In this way, since the two pumping elements 18 are actuated in phase opposition, the fuel sent to the pump 7, through the intake pipe 10, is sucked in only by the pumping element 18 which at that instant carries out the suction stroke, in so far as the intake valve 25 of the other pumping element 18 which has started the compression phase is closed.

Advantageously, the instants Tstart and Tend are symmetrical with respect to the instant To of the bottom dead centre BDC and the instant T1 of the top dead centre TDC of the piston 21. In this way, the fuel is sent to the pumping element 18 when the latter is moving at a higher speed, i.e., when in the compression chamber there is the maximum negative pressure, so that opening of the intake valve 25 is favoured even at reduced pressure of the fuel in the intake pipe 10. Furthermore, in this way, there is obtained simultaneously both regulation of the duration of suction by the pumping element 18, i.e., of the part of the suction stroke in which intake is actually performed, and regulation of the angular phase of said suction with respect to the position of the piston 21.

On the contrary, the delivery of the fuel of the pumping element 18 is carried out starting from a point Tm during the delivery stroke up to the end of said stroke. In FIG. 2, the two hatched areas A and B, which are equivalent, indicate, respectively, the volume of fuel taken in and the volume of compressed fuel delivered. In this way, dosage of the fuel pumped is obtained exclusively by the on-off solenoid valve 27.

Since the head supplied by the electric pump 9 is known and since the pressure in the intake pipe 10 is practically constant, on-off operation of the solenoid valve 27 enables introduction, with excellent resolution, of a pre-defined amount of fuel into the volume upstream of each compression chamber 20.

Figure 3:
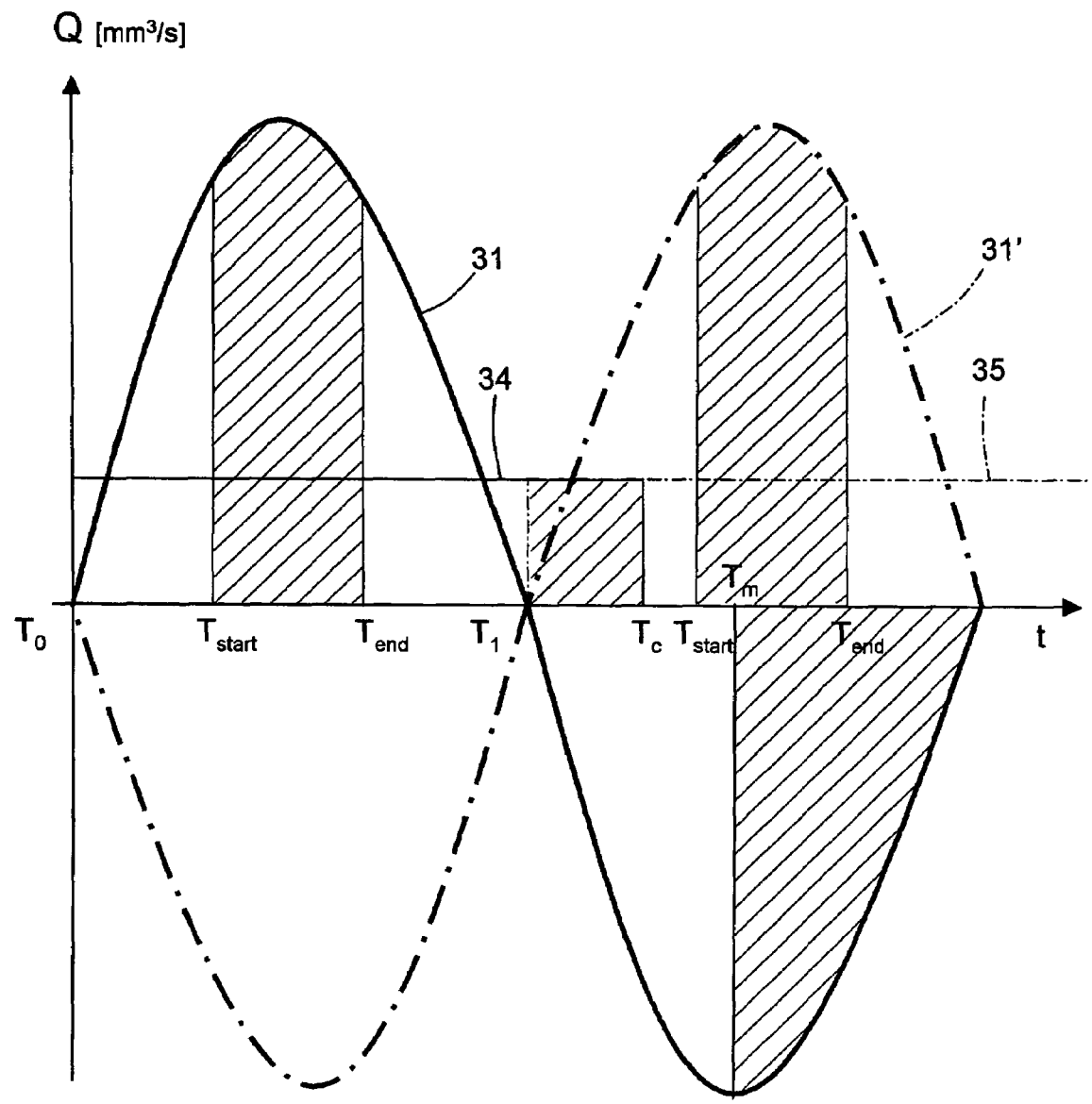
FIG. 3 is a diagram that illustrates an aspect of operation.

Represented in FIG. 3 with a solid line, is the diagram 31 of operation of one of the two pumping elements 18, for example the bottom pumping element 18, whilst represented with the dashed and dotted line is the diagram 31' of the other pumping element 18, i.e., the top pumping element 18. In the diagram considered, the two pumping elements 18 have a common stretch of intake pipe 10; consequently, in the case of marked partialization of the suction, in the common pipe 10 there is a small amount of liquid fuel and a large amount of vapour. The intake valve 25 of a pumping element 18, for example the bottom pumping element 18, does not succeed in closing at the end of the suction stroke, but remains open for a stretch T1–Tc of the corresponding compression stroke. This stretch T1–Tc occurs simultaneously to the suction stroke of the other pumping element 18, i.e., the top one, during which the corresponding intake valve 25 is also open. In FIG. 3, the solid line 34 indicates the duration of the opening of the valve 25 of the bottom pumping element 18, whilst the dashed and dotted line 35 indicates the duration of the opening of the valve 25 of the top pumping element 18. The hatched area indicates the stretch T1–Tc of simultaneous opening of the two valves 25.

In this way, the pumping element 18 that is in the delivery phase, continues to suck in the fuel of the common intake pipe emptying it completely before the solenoid valve 27 re-opens. Preferably, the stretch T1–Tc is equal to the entire part of the suction stroke of the pumping element 18 during suction, in which the solenoid valve 27 is closed, or is slightly shorter. In this way, dosage of the fuel compressed by the pump 7 is entirely performed by the on-off solenoid valve 27 with extreme precision, even for small flow rates.

Figure 4:
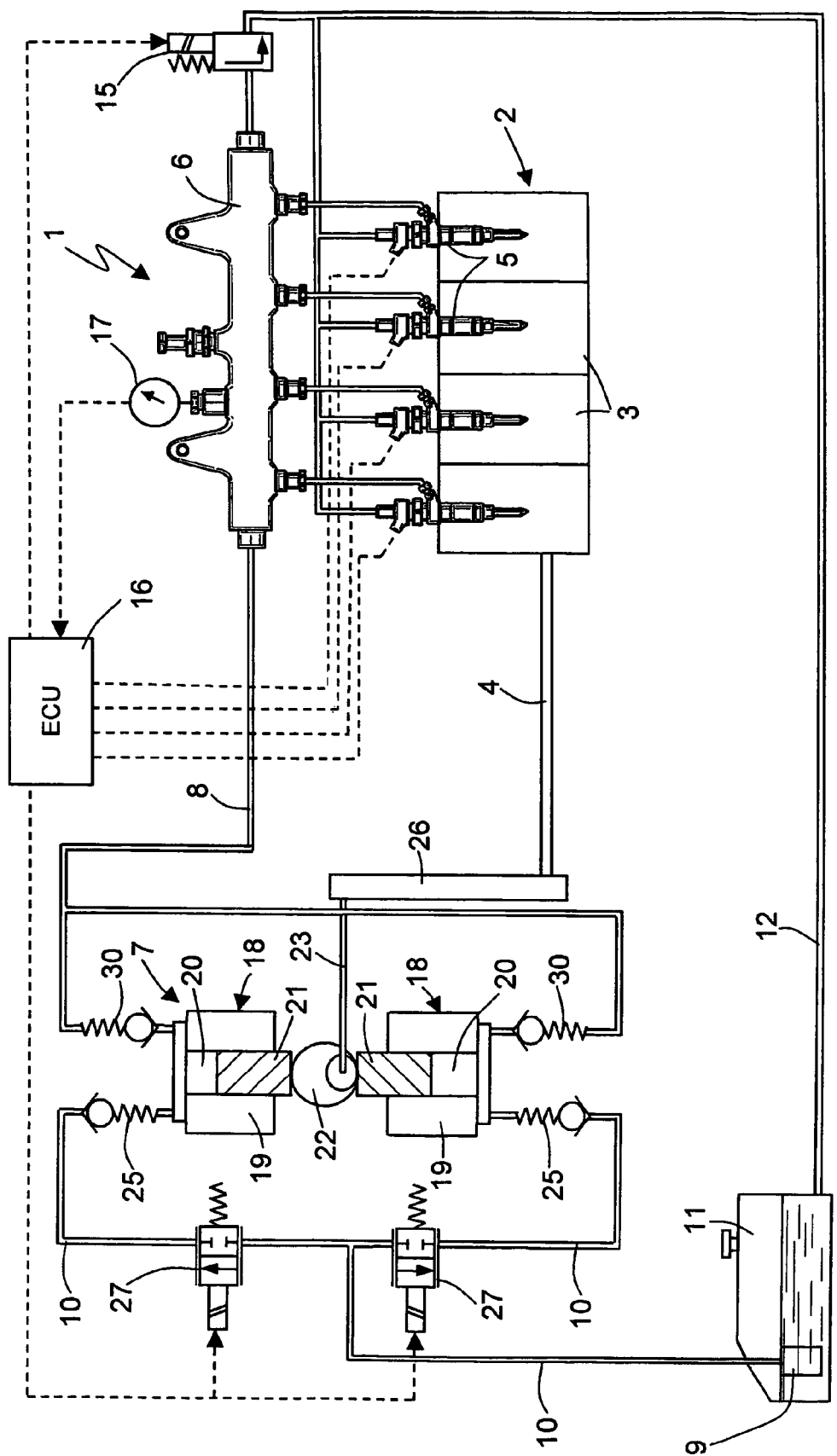
FIG. 4 is a diagram of a fuel-injection system in an internal-combustion engine, comprising a high-pressure pump with a flow-rate regulation device according to a different embodiment of the invention.

A different embodiment is illustrated in FIG. 4, in which there is provided one on-off solenoid valve 27 for each of the two pumping elements 18.

This embodiment enables both the instant of opening Tstart and the instant of closing Tend of each on-off solenoid valve 27 to be varied, thus enabling synchronization of the opening of the on-off solenoid valve 27 with the time interval in which the corresponding pumping element 18 moves with the higher speed and hence when in the compression chamber of the pumping element 18 itself the negative pressure is maximum.

It is evident that in this way there is the certainty that the amount introduced by the on-off solenoid valve 27 is entirely taken in by the corresponding pumping element 18, with evident beneficial effects on the accuracy of the amount sent in each cycle by the pump 7 to the accumulation volume 6. Furthermore, in this embodiment sizing of the springs of the intake valves 25 of the pumping elements 18 is less critical, in so far as any possible asymmetry between the latter have very small consequences on the symmetry of suction of the pumping elements 18.

According to another aspect of the invention, as on-off solenoid valve 27 there may advantageously be employed one or more known electrically controlled injectors, which are normally used in internal-combustion engines, controlling them as solenoid valves. In particular, the use of branched petrol/gas fuel injectors as on-off solenoid valves presents the following advantages:

known and asserted technology for the fabrication of the components;

lower investment cost, with consequent lower unit cost of the injection system;

ready availability from various suppliers;

practically the same control as the one necessary for operation as electrically controlled injector; and operation of the injector also as safety valve of the system.

From the above description, the advantages of the high-pressure pump with a device for regulating the flow rate of fuel according to the invention as compared to the known art are evident. In particular, at each injection, there is sent to each pumping element 18 only the fuel required for the simultaneous injection, so that the function of dosage of the fuel is performed substantially by the on-off solenoid valve 27 and is a function of the pressure difference across the on-off solenoid valve 27 and its cross section. Furthermore, actuation of the solenoid valve 27 in a chopped way, by modulating both the instant of start and the instant of end of the effective suction, during the suction stroke of the corresponding pumping element, there is obtained a symmetry with respect to the entire suction stroke such as to concentrate the supply of fuel to the chamber 20 in the period of maximum speed of the piston 21.

Finally, in the case of extreme partialization of the suction, the delay of closing of the intake valve 25 of a pumping element 18 enables intake of part of the fuel remained in the common intake pipe 10 and being to go to the other pumping element 18, thus enabling a higher precision of dosage of the fuel sent at each pumping stroke.

It is understood that various modifications and improvements can be made to the high-pressure pump and to the corresponding regulation device described above, without departing from the scope of the claims. For example, it is possible to eliminate the motion transmitting device 26 and to actuate the shaft 23 of the high-pressure pump 7 at a differently controlled rate. Also the drain solenoid valve 15 of the fuel from the accumulation device 6 can be eliminated.

Furthermore, the two pumping elements 18 can be arranged in parallel and actuated in phase opposition by two different cams. Finally, the pump 7 can have a different number of pumping elements, for example three pumping elements actuated by a common cam with a phase offset of 120°. In this case, since the 180° suction stroke of each pumping element 18 is carried out in partial overlapping with the suction stroke of the other pumping elements, it is necessary to set an on-off solenoid valve on the branch of the suction pump of each pumping element, instead of on the branch of pipe common to the pumping elements.

The invention claimed is:

1. A high-pressure pump with a device for regulation of the flow rate for a fuel-injection system of an internal-combustion engine, comprising:

at least one pumping element, which is actuated with reciprocating motion through corresponding suction and delivery strokes and is provided with a corresponding intake valve in communication with an intake pipe, and a corresponding delivery valve in communication with an accumulation volume of pressurized fuel; and said regulation device of said pump comprises at least one on-off solenoid valve for shutting off the fuel supplied to said pumping element, said solenoid valve being set on said intake pipe and being actuated during the suction strokes of said pumping element with a certain delay with respect to the start of the suction strokes themselves, wherein opening of said solenoid valve occurs at a point corresponding to an intermediate part (Tstart-Tend) of each suction stroke of said pumping element, and wherein said intermediate part (Tstart-Tend) is obtained by varying both the instant of start (Tstart) and the instant of end (Tend) of opening of said solenoid valve.

2. The high-pressure pump according to claim 1, wherein said intermediate part (Tstart-Tend) is symmetrical with respect to said suction stroke.

3. The high-pressure pump according to claim 1, wherein said solenoid valve is designed to be controlled in a chopped way by a control unit as a function of the conditions of operation of said engine.

4. The high-pressure pump according to claim 1, wherein said solenoid valve has a cross section which enables said solenoid valve to supply said pumping element only with the fuel required for the corresponding suction.

5. The high-pressure pump according to claim 1, further comprising a plurality of pumping elements, each pumping element equipped with a corresponding intake valve, said intake valves being in communication with a common intake pipe, wherein said solenoid valve is set on said common intake pipe.

6. The high-pressure pump according to claim 5, wherein the plurality of pumping elements comprises a pair of pumping elements actuated in phase opposition, wherein said solenoid valve is actuated in synchronism with each suction stroke of said pumping elements as a function of the operating conditions of said engine.

7. The high-pressure pump according to claim 5, wherein a delay with which said solenoid valve is actuated with respect to a start of the suction stroke of one of said pumping elements is a function of the fuel supplied to the other of said pumping elements during its previous suction stroke.

8. The high-pressure pump according to claim 1, with a number of pumping elements (18), each equipped with a corresponding intake valve (25) set on a corresponding suction pump, characterized in that it comprises a number of said solenoid valves (27) equal to the number of said pumping elements (18), each of said solenoid valves (27) being set on the suction pipe of a corresponding pumping element (18).

9. The high-pressure pump according to claim 8, comprising a pair of pumping elements (18) actuated in phase opposition, characterized in that said solenoid valves (27) are actuated in synchronism with the suction strokes of the corresponding pumping elements (18) as a function of the conditions of operation of said engine (2).

10. The high-pressure pump according to claim 4, wherein a displacement of said pumping element is of the same order of magnitude as a maximum volume of fuel that an injector can inject into a cylinder of the engine.

11. A high-pressure pump with a device for regulation of the flow rate for a fuel-injection system of an internal-combustion engine, comprising:

at least two pumping elements, which are actuated with reciprocating motion through corresponding suction and delivery strokes and are provided with a corresponding intake valve in communication with a common intake pipe, and a corresponding delivery valve in communication with an accumulation volume of pressurized fuel;

an on-off solenoid valve set on said intake pipe for shutting off the fuel supplied to said pumping elements, wherein said solenoid valve has a cross section enabling said solenoid valve to supply said pumping elements substantially with the fuel required for the corresponding suction, wherein said solenoid valve is actuated during an intermediate part (Tstart-Tend) of each suction stroke of said pumping elements, and wherein said intermediate Dart (Tstart-Tend) is obtained by varying both the instant of start (Tstart) and the instant of end (Tend) of opening of said solenoid valve.

12. The high-pressure pump according to claim 11, wherein a pair of said pumping elements are actuated in phase opposition, and wherein said intermediate part (Tstart-Tend) is symmetnc with respect to the relevant suction stroke of said pumping elements.

13. The high-pressure pump according to claim 12, wherein said intermediate part (Tstart-Tend) starts with a certain delay (To-Tstart) with respect to the start (To) of the relevant suction stroke, so that a time stretch (T1 -Tc) of the suction stroke of one pumping element during which the relevant intake valve is still open occurs while the intake valve of the other pumping element does not succeed in closing at the end of its suction stroke.

* * * * *